United State
Wainer

Re. 28,956
ɜued Sept. 7, 1976

[54] LATENT IMAGE PHOTOGRAPHIC SYSTEM

[75] Inventor: Eugene Wainer, Shaker Heights, Ohio

[73] Assignee: Horizons Research Incorporated, Cleveland, Ohio

[22] Filed: Feb. 1, 1971

[21] Appl. No.: 111,773

Related U.S. Patent Documents

Reissue of:

[64] Patent No.: 3,042,517
Issued: July 3, 1962
Appl. No.: 842,569
Filed: Sept. 28, 1959

[52] U.S. Cl. ..... 96/48 HD; 96/48 R; 250/316; 96/90 R; 96/115 P; 260/17 R

[51] Int. Cl.[2] ..... G03C 1/52; G03C 5/24

[58] Field of Search ..... 96/48 R, 48 HD, 90 R, 96/115 P; 250/316; 260/88.3 R, 80.3 R

[56] References Cited

UNITED STATES PATENTS

| | | | |
|---|---|---|---|
| 1,658,510 | 2/1928 | Beebe et al. | 96/48 R |
| 2,072,465 | 3/1937 | Reppe et al. | 260/80.3 R |
| 2,276,840 | 3/1942 | Hanford et al. | 260/88.3 R |

*Primary Examiner*—Won H. Louie, Jr.
*Attorney, Agent, or Firm*—Lawrence I. Field

[57] ABSTRACT

This invention relates to compositions which are sensitive to light and suitable for photography and photographic reproduction purposes. More particularly, the invention relates to the production of stable, colored print-out and developable-out images produced by exposing to light, and to light and heat, combinations of aryl amines, halogenated hydrocarbon compounds, and N-vinyl compounds disposed in a suitable base.

21 Claims, No Drawings

LATENT IMAGE PHOTOGRAPHIC SYSTEM

Matter enclosed in heavy brackets [ ] appears in the original patent but forms no part of this reissue specification; matter printed in italics indicates the additions made by reissue.

The principal objects of this invention are to provide stable compositions comprising aryl amines, N-vinyl compounds, and halogenated hydrocarbon compounds in a plastic base; to produce under the influence of ultraviolet or visible light, a color form as the result of a reaction between components in said composition; to develop this color forming reaction solely through the use of exposure to ultraviolet light or visible light for a time sufficient that a colored image of high contrast is obtained; to provide systems which on exceptionally short exposure to either ultraviolet or visible light will produce a substantially non-visible latent image which is subsequently made visible by heating or treating with infrared without affecting the non-light struck areas; to produce a negative-positive result by first exposing through a negative to a source of ultraviolet light and subsequently developing by heat; to produce a positive-positive image by first giving an extremely brief exposure to the entire surface to ultraviolet light, placing a black image against the surface of such light struck area, and heating the system from the direction of the back of the superimposed black image, or in some cases, from the back of the light struck transparent film, so as to heat develop an image on the previously light struck film; to provide systems in the exposure, development, and fixing stages which may be processed by totally dry techniques; to provide means of stabilization of both pre-exposed and exposed surfaces so that the desired color reactions take place only on exposure to light or heat or combinations of both; to provide means of stabilization of both the pre-exposed and the developed image so that the photosensitive surface is sufficiently permanent for practical purposes on storage both before and after exposure without fogging or fading; and, it is a further object of the invention to establish systems in which the desired color is developed by exposure to light and the facility for producing such a color as the result of exposure to light of a similar wavelength is either destroyed by exposure of the system to strong infrared or is incapable of producing an image unless a specific combination of ultraviolet light and infrared is imposed on the film.

In a copending application, Ser. No. 787,112, filed Jan. 16, 1959, an invention was described comprising a light sensitive print-out composition which develops a color on exposure to light and is capable of being fixed in a stable form by subsequent heating. The print-out compositions disclosed therein were composed of combinations of aryl amines, halogenated hydrocarbon compounds, a plastic film forming base, minor amounts of basic materials such as amines or zinc oxide, minor amounts of phenol derivatives, and included combinations of these aryl amines to produce specific color effects. The above application also disclosed sensitization of the system to the visible by the addition of a yellow-to-red type of color former, exposure to ultraviolet if this visible range color sensitizer is not present, and finally disposing such over-all system on a suitable base such as glass, paper, plastic film, and the like. A significant feature of this invention is the fact that the full color is obtained only as the result of exposure to light and the subsequent heating step is merely for the purposes of fixing the overall system without effecting any noticeable change in the color originally developed in the photosensitive film.

In another copending application, Ser. No. 841,459, filed Sept. 22, 1959, an invention was described comprising a light sensitive print-out or color change composition which develops the color or color change on exposure to light, composed of combinations of acid-base type indicators and halogenated hydrocarbon compounds disposed in or on a plastic or other type of base in which the plastic or other type of base contains hydrogen and oxygen. In that application, the color forming reaction appeared to take place through a change in pH to the acid side and the full color or color change is obtained solely through the use of light and any fixing or stabilization steps merely eliminate the ultraviolet sensitivity of the reaction, whether heat is used or not, without changing the color originally developed by the light substantially as a result of such heating or fixing steps.

In still another copending application, Ser. No. 841,460, filed Sept. 22, 1959, light sensitive print-out compositions were described which developed color on exposure to light and are capable of being fixed in stable form simply by exposure to moist air, eliminating the need for a heating step to accomplish such fixing, these light sensitive compositions being composed of combinations of aryl amines, halogenated hydrocarbon compounds, and suitable sulfur compounds. Again, the full color available from such print-out composition is developed solely through the use of exposure to light, and any subsequent fixing step does not change the color substantially in depth or in hue.

All of the inventions described in the aforementioned copending applications have a number of general features in common. In examining the photographic properties in a practical sense, all are relatively slow in terms of photographic speed, requiring exposures in the range of 1 to 10 seconds for a full print-out of the color. All of then are print-out processes in which the color is developed substantially solely as the result of length of exposure to ultraviolet or visible light. None of them exhibit evidence of a latent image susceptible to subsequent development by dry techniques, in a true sense. As a result of these characteristics, the processes are invariably negative-to-positive and are generally suitable primarily for the preparation of prints from a negative, for document reproduction and photocopy purposes.

I have found that the addition of N-vinyl compounds to combinations of an aryl amine, a halogenated hydrocarbon compound, and a plastic base with or without the addition of sulfur compounds as described in one of the above noted specification and with or without the ultraviolet absorbers and sensitizers to the visible as described in another of the above specifications, not only radically increases the susceptibility of the system to production of a photographic effect as the result of exposure to ultraviolet or visible light (this latter in the presence of visible light sensitizers) but also makes the system capable of producing a substantially non-visible latent image at high photographic speeds, which latent image is capable of being subsequently developed to full density by use of heat or infrared. Not only can such a system be utilized as a negative-positive process, but by suitable modification, such a system may also be utilized as a positive-positive process, if desired. It is difficult to define the photographic speed of the system just described in exact terms, but relatively speaking, this may be defined by the fact that normally a combination of an aryl amine and a halogenated hydrocarbon compound will require one to ten seconds of exposure in order to produce the fully developed image, there being no latent image available. With the same type of light, the systems described in the present specification will produce a latent image under exposure times of ten milliseconds or less, and development is obtained by heating in a specified temperature range for periods varying from five seconds to one minute, in order to achieve full density as the result of the developing reaction. The heating also simultaneously produces fixing of the unexposed areas. If exposure times are used comparable to those required in the process where only aryl amines and halogenated hydrocarbon compounds are present as the sensitive agents, namely, exposure times in the range of one to ten seconds, then a full print-out image of high density is obtained through the use of the addition of the N-vinyl amines. The color of the print-out image is still further deepened by infrared fixing and stabilization is obtained as the result of such infrared fixing.

When such a film is used in the normal sense by exposure through a negative to light, it operates as a negative-positive system as the result of heat development. If the entire film is first sensitized by an extremely brief exposure to ultraviolet light and then suitably exposed to infrared through a black image, then a positive-to-positive result is obtained and direct reproduction of the original black image is achieved. When the material is used as a direct positive reproducer, then sulfur compounds are added in order to achieve fixing by exposure to moist air as described in a previous application.

As the result of the high speed inherent in the present system which includes the N-vinyl compounds, it is possible to use these photographic compositions not only for document reproduction, office photocopy, line copy work, in both positive and negative renditions, but also in direct camera work for the recording of images and visual events in the manner commonly utilized in a camera with a silver halide sensitive surface.

Except for the N-vinyl compounds, the systems about to be described are substantially those disclosed in the several copending applications noted above. Essentially such systems comprise the following classes of constituents:

Plastic base
Organic halogen compound
Aryl amine
Ultraviolet absorber (optional)
Sensitizer to visible light (optional)
Sulfur compounds (optional), and
Plasticizer (optional)

For simplicity suitable members of each class are enumerated below by way of illustration. It will be understood that other similar materials may be used in the systems without departing from the intended scope of the invention.

Thus, the plate base is preferably a 10% solution of a film forming plastic material selected from the following table.

TABLE 1

Plastic Bases (10% Solution)

| Number | Film Forming Material | Solvent | "Fogging" order (Infrared or Heating Safety Factor), percent |
|---|---|---|---|
| 1 | ethyl cellulose | 30 acetone<br>40 toluene<br>30 methyl alcohol | >100 |
| 2 | polyvinylchloride | 80 tetrahydrofuran<br>20 acetone | >100 |
| 3 | polystyrene | 90 toluene<br>10 acetone | >100 |
| 4 | chlorinated rubber | 70 toluene<br>30 acetone | 100 |
| 5 | polyvinylacetate | 40 methyl alcohol<br>40 acetone<br>20 toluene | 100 |
| 6 | polymethylmethacrylate | 70 acetone<br>30 ethyl acetate | 75 |
| 7 | cellulose acetate | 30 methylene dichloride<br>70 acetone | 50 |
| 8 | polyvinylidene copolymer:<br>60 vinylidene chloride.<br>40 vinyl chloride | 80 tetrahydrofuran<br>20 acetone | 20 |
| 9 | cellulose nitrate | 30 ethyl alcohol<br>70 ethyl ether | 10 |

In Table 1 above, the plastic bases are listed in a particular order designated as the "fogging" order. While all of the various plastic bases listed in the table are useful for the purposes of this invention, some are more useful than others. In the normal course of obtaining an image as the result of heat development of the previously obtained latent image, the fully available density is derived by the heat treatment. If the heat treatment is prolonged beyond the point of obtaining full density either for too long a time or at too high a temperature, color development or "fogging" starts to appear in the non-light exposed areas and the fully available contrast possible through the medium of the system is not achieved. Hence choice of one or another of the types of plastic base listed which is to be utilized for the purposes of this invention provides a safety factor with respect to fogging. For example, ethyl cellulose and polyvinyl chloride may be heat treated for at least twice as long as that necessary to achieve maximum density without any signs of fogging appearing in the non-light struck areas whereas the poorest plastic base in the series, namely, cellulose nitrate, requires not only careful control of temperature in developing maximum density, but this temperature cannot be applied longer than 10% more than is required to achieve maximum density before fogging of a serious nature begins to appear. In summary, then, the only difference between these various plastic bases is the degree of care which must be exercised to prevent fogging in the heat development step.

Optionally a plasticizer may be used with the plastic base material, amounts of between 25% and 100% by weight of the resin on a dry basis having been found satisfactory. Suitable plasticizers include: tricresyl phosphate, tri(2-ethylhexyl) phosphate, dioctylphthalate, di(2-ethylhexyl)tetrahydrophthalate, di(2-ethylhexyl)maleate, and polyethylene glycol.

Suitable aryl amines include secondary and tertiary amines such as diphenylamine, dibenzylamine, triphenylamine, diphenylguanidine, triphenylguanidine, N-N'-di-methylaniline, N-N'-diethylaniline, p-p'-methylenebis-(N-N'-dimethylaniline), p-p'-benzylidenebis(N-N'-dimethylaniline), p-p'-p''-methylidenetris(N-N'-dimethylaniline), and mixtures of primary amines as for example a mixture of aniline, paratoluidine and orthotoluidine. Complexes of the foregoing and other amines having similar base structures may also be used.

Preferred suitable organic halogen compounds for the present invention are carbon tetrabromide, iodoform, hexachlorethane tetrabrombutane, hexachlorbenzene and tetrachlortetrahydronaphthalene. As described in my earlier filed application Ser. No. 787,112, the activation energy of the halogen free-radical is the important determining factor and it appears that in order for the halogenated hydrocarbon to be effective in the present process it must have an energy of dissociation, or in other words an energy of formation of the free halogen radical, of not less than 40 kilogram calories per mole. Each of the halogen compounds, indicated above as preferred, it will be noted, is a halogenated hydrocarbon in which at least one active halogen (Cl, Br or I) is attached to a carbon atom having not more than one hydrogen atom attached thereto.

The preferred sensitizer to visible light is N-N'-dimethylphenylazoaniline.

Ultraviolet absorbers which may be used to increase speed in the ultraviolet include benzil, benzoin, stilbene derivatives, phenylsalicylate and benzophenone derivatives.

When a positive-positive process is involved or when fixing by other means than through the use of heat, sulfur compounds such as thiourea, thioacetamide, thiocarbanilide, dodecanethiol or zinc sulfide may be used. The addition of these sulfur compounds is generally not required when a negative-positive process is being practiced.

The N-vinyl compounds suitable for the purposes of my invention are those in which the vinyl grouping is always attached directly to a nitrogen atom. More specifically, the N-vinyl compounds suitable for the purposes of my invention are heterocyclic and aryl amines, such as N-vinylindole, N-vinylcarbazole, N-vinylphenyl-alpha-naphthylamine, N-vinylpyrrole, and N-vinyldiphenylamine, stabilized with 0.1% NaOH; and N-vinylimides and N-vinylamides such as N-vinylsuccinimide, N-vinylphthalimide, N-vinylpyrrolidone, N-vinyl-N-phenylacetamide, N-vinyl-N-methylacetamide, N-vinyldiglycolylimide, and the like. Of these, the N-vinylindole, the N-vinylcarbazole, the N-vinylphenyl-alpha-naphthylamine, N-vinylsuccinimide, N-vinylphthalimide, N-vinyldiglycolylimide, and N-vinylpyrrolidone are preferred.

These N-vinyl compounds when mixed with a suitable halogenated hydrocarbon compound and properly disposed in a plastic base themselves undergo a novel series of reactions on exposure to light at a suitable wavelength such as ultraviolet. Whereas mixtures of appropriate aryl amines with a suitable halogenated hydrocarbon compound and disposed in a plastic base will, on exposure to ultraviolet light, rapidly print-out a full color as described in my above-noted copending applications; in the case of compositions containing in addition thereto the N-vinylamines and other indicated N-vinyl compounds, the visible change evident as the result of even lengthy and intense exposure to ultraviolet light for the majority of plastic bases is relatively slight. It is only after this previously exposed film is heated for a few seconds to temperatures of the order of 90 to 120° C. that a visual change takes place, this being sometimes the development of a somewhat pale color and in other cases the development of insolubility or opacity, as the result of such insolubility.

For example, if a dried film is prepared by casting from solution, and such dried film is composed of substantially equal parts of carbon tetrabromide, N-vinylcarbazole, and a plastic base and such a sensitive film is then exposed a ultraviolet liht (G.E. sunlamp at a distance of 10 inches) for a period of about 10 seconds, no visible change is seen in either color or transparency when the plastic base is taken from the group polystyrene, ethyl cellulose, chlorinated rubber, polyvinyl acetate, polymethylmethacrylate, and polyvinyl chloride. When the plastic base is composed of cellulose acetate or cellulose nitrate, a very faint gray is obtained on the 10 second exposure, and if the exposure is extended to at least 20 seconds and preferably as long as 30 seconds, this faint gray turns to a very pale blue. In the group of compositions in which no visible change takes place in the ultraviolet light under a 10 second exposure, continued exposure for three minutes still does not produce a visible change, whereas in the case of the cellulose nitrate and the cellulose acetate, extension of the ultraviolet exposure time for a period of three minutes maintains the very pale blue low contrast image which has been obtained previously in the 20 to 30 second range. When these previously exposed films are heated at a temperature between 90 and 120° C. for about 2 minutes; very much stronger colors are then obtained, generally of a green-brown hue somewhat weak in tinctorial power. However, it is clear from the depth of color which has been obtained that a very substantial development has taken place. With polystyrene, ethyl cellulose, cellulose nitrate, chlorinated rubber, and cellulose acetate and polyvinyl chloride, the image is greenish brown or greenish black. With polyvinyl acetae, the image is a pale brown and with polymethylmethacrylate, it is a pale gray. The image with cellulose nitrate is opaque and the portions which have not been exposed to ultraviolet light remain transparent. With cellulose nitrate, it appears that an insoluble constituent has developed, and to a certain extent this also appears to be true of the cellulose acetate type of base. If extremely short ultraviolet exposures are utilized, i.e., less than one second, proportionately longer times are required for the infrared development, and in general, the system is slow, but certainly as fast as the direct print-out using the aryl amines as described in the copending applications previously noted. The variations in the type of the N-vinyl compounds also give variations in the results obtained. For example, N-vinylpyrrolidone generally will also produce no visible image on exposure to ultraviolet light, but on subsequent heating an opacity develops in the majority of the plastic bases which are used with no significant color change. If N-vinylindole is used, the colors which are obtained are decidely reddish or pinkish tending towards the reddish brown rather than greenish brown obtained with N-vinylcarbazole.

Accordingly, these N-vinyl compounds exhibit decomposition reactions under the influence of light and in the presence of the halogenated hydrocarbon compound with are primarily made visible only as the result of subsequent heating at speeds comparable to the print-out mechanisms found initially with combination of aryl amines and halogenated hydrocarbon compounds where the color prints out directly.

The table which follows presents the preferred ratios of the several constituents in the compositions of this invention.

TABLE 2

Preferred Composition Ranges of Ingredients

| Reagent | Parts by Weight (Range) |
|---|---|
| 1. Solvent | 500 to 1,000 |
| 2. Resin or plastic base | 100 |
| 3. Aryl amine (Preferred but optional) | 10 to 100 |
| 4. Halogenated hydrocarbon compound | 10 to 200 |
| 5. N-vinyl compound | 10 to 200 |
| 6. Sulfur compound (optional) | 0 to 30 |
| 7. Photosensitizer to visible (optional) | 0.05 to 1.0 |
| 8. Ultraviolet absorber (optional) | 0.1 to 1.0 |
| 9. Plasticizer (optional) | 10 to 100 |

Now, if the print-out type of aryl amine of the type designated above is added to the system fundamentally composed of a plastic base, a halogenated hydrocarbon compound and an N-vinyl compound, a totally unexpected result is obtained. The system may be sensitized for subsequent development by heat or infrared with extraordinary short exposures to ultraviolet light, and if sensitizers to the visible are incorporated, these short exposures may be obtained with visible radiation. In addition, it is found that the system is still compatible with the sulfur compounds previously described to permit fixing by exposure to moist air. For example, a mixture of approximately equal parts of a plastic base such a polyvinyl chloride, N-vinylcarbazole, carbon tetrabromide, and diphenylamine is exposed in dry film form to an 85 watt/second capacitative discharge flash lamp at a distance of 3 feet for a time of 0.001 second. The amount of ultraviolet in the particular flash lamp used in extremely small and no visible change in color is seen in the ultraviolet exposed areas. If this film is now heated for a time of 10 to 20 seconds at a temperature between 90 and 120° C., then an extremely dense opaque brown-black image of exceptionally high contrast develops out, and the portions of the film which have not been exposed to the ultraviolet light remain clear and transparent. Equally important is the fact that the heating step apparently accomplishes fixing simultaneously with the development out of the color. This is defined by the fact that the non-light exposed areas after being fixed with heat are no longer sensitive to ultraviolet light and will no longer decompose to produce a color by a subsequent exposure to ultraviolet light followed by heat. The exposure lamp used in this particular instance was a capacity discharge xenon flash lamp with a power output during the flash of approximately 85 watt/seconds. The xenon flash lamp simulates bright daylight and a very small proportion of total radiation is in the ultraviolet, it being estimated that less than 10% of the total radiation of the lamp is in the ultraviolet region below 4000 A. If a minor amount of a sensitizer to the visible such as a phenylazoaniline is added to the film, the one millisecond flash under the conditions described appears to be sufficient to over-expose the film very substantially. If the heating step is omitted and this combination of aryl amines, N-vinyl compounds, halogenated hydrocarbon compounds, and plastic base is exposed to a more normal ultraviolet source, namely, a G.E. 275 watt sunlamp with a glass envelope at a distance of 10 inches, the system will again act as a print-out in which the full depth of color is obtained by exposure to such a lamp in a time of a few seconds, usually in the range of 1 to 10 seconds. Colors are comparable to those obtained in the absence of the N-vinyl compound, except that they tend to be substantially darker in hue. Usually a diphenylamine will produce a blue-black image under these conditions of exposure, whereas in the presence of the N-vinyl compound, a diphenylamine tends to yield a brown-black image. With such extremely heavy ultraviolet exposures, subsequent development with infrared does not produce a highly noticeable improvement except to produce an agreeable degree of opacity which further improves the contrast of the color, and the sole purpose of infrared treatment is then to insure fixing and removal of sensitivity of the film.

Thus, the combination of aryl amines and the N-vinyl compounds produces a synergistic effect in which latent image phenomena are made available subject to development so that the over-all quantum yield is exceptionally high.

Because of the high sensitivity of this system, a variety of techniques may be utilized for obtaining the eventual image and, as a result, greatly broaden the range of utility for this photosensitive system.

In the simplest case, the photosensitive film is exposed to ultraviolet or visible light either through a negative or in the camera and subsequently developed and fixed by heat. Under these circumstances, a negative-positive process is available. Instead, the photosensitive film may be given a brief blanket exposure to light, and then a black image or infrared absorber is placed against the surface of such presensitized or preexposed photosensitive film and the heating under conditions which heat the presensitized film preferentially as the result of the improved absorption of infrared energy in the black image areas which are thus transmitted directly to the photosensitive film. Under these circumstances, a positive-to-positive rendition is obtained. A third variation is to expose the film initially to an infrared image source either by transmission or through direct contact and through the medium of transfer of heat from the infrared absorbing areas so as to make the film insensitive in such infrared heated areas, and then subsequently treat with an exposure of light to print-out the non-infrared exposed areas. In this latter case, the film should contain sulfur compounds to permit moist air fixing. Thus, by varying the routing and conditions of exposure, either a negative-positive or a positive-positive result may be readily acheived.

In making infrared exposures of documents and printed matter, the printed page to be copied is placed in intimate contact with the sensitive film and may be heated either through the back of the printed copy or, if the plastic base containing the photosensitive area is sufficiently transparent to infrared, heated through the transparent film so that the black image on the original copy heats up more rapidly than the non-black areas. Suitable sources of infrared for this purpose are either the standard infrared lamps used for print making purposes or heating coils or silicon carbide heating elements suitably disposed in a reflecting trough, in which the color temperature of these heating elements should not exceed approximately 650° C.

Having defined my invention, the following examples are indicative of my specific method of practice:

EXAMPLES 1–13

A plastic dope was formed by dissolving 100 parts by weight of ethyl cellulose in 1000 parts by weight of a mixture of 300 parts of acetone, 300 parts of methyl alcohol and 400 parts of toluene, by weight. Thereafter each of the ingredients listed in Table 3 was added to the plastic dope. The addition was made under a yellow safe light and the resulting composition was stirred until the addition had completely dissolved. In this manner there was added to the dope the several ingredients, in the amounts shown in Table 3 and in the following order: diphenylamine as the aryl amine; N-vinylcarbazole as the N-vinyl compound: carbon tetrabromide as the halogenated hydrocarbon compound; benzoin as the sensitizer to ultraviolet; N-N'-dimethylphenylazoaniline as the sensitizer to the visible light; and thioacetamide as the chemical fixing agent.

The mixture, prepared under a yellow safe light, and while still under the yellow safe light, was cast on glass microscope slides and allowed to stand under the safe light until all of the solvent had been dissipated by evaporation leaving the composition as a thin dry film of ethyl cellulose containing a uniform dispersion of those additional constituents present in the original dope.

Thereafter the dried film was given one of two exposures. In the first the plastic base plus additives was exposed to a conventional ultraviolet source, a G.E. 275 watt sunlamp with a glass envelope spaced at a distance of 10 inches from the dried film. In the second, the exposure was to a xenon capacitative discharge lamp in which approximately 10% of the available light energy was in the ultraviolet, operated at a power discharge at the lamp of 85 watt/seconds, and the sensitive film was exposed to such a light at a distance of 3 feet. The time of discharge of such a lamp is one millisecond. When more than one millisecond was used, this refers to multiple discharges. After either exposure to ultraviolet, the infrared development was accomplished by placing the exposed glass side on a hot plate in the dark, said hot plate having previously been stabilized at a surface temperature of 120° C. Previous experience had indicated that under such conditions it required about 45 seconds for the glass plate to achieve a temperature between 90° and 120° C. The time of infrared exposure or heat development listed in the table is the number of seconds of treatment on the hot plate over 45 seconds. In each example, the infrared exposure on the exposed photosensitive film was 15 seconds, this being insufficient to fog the non-light exposed backgrounds.

Adequate hot development was also obtained as follows: using the film base given in Example 5, a section roughly 4 inches wide and one foot long was cast on a glass plate of thickness such that the fully dried film had a final thickness of approximately two mils. The film was then stripped off the glass. After exposure to the G.E. sunlamp, the film was run through hot steel rolls having a separation of 1.8 millimeters and maintained at a temperature of 150° C. The speed of travel through the rolls was approximately 0.5 inch per second and full development of the color without fogging was obtained under such circumstances, thus establishing the fact that absorbed heat is the source of development energy.

TABLE 3

Examples 1–13

| Example No. | Diphenylamine | N-vinyl carbazole | $CBr_4$ | Benzoin | N-N'-dimethylphenylazoaniline | Thioacetamide | Ultraviolet Exposure,[1] sec. | Ultraviolet Exposure Xenon,[2] sec. | I.R. Treatment 90 to 120° C., sec. | Color Result | Contrast |
|---|---|---|---|---|---|---|---|---|---|---|---|
| 1 | | 100 | 100 | | | | 10 | | 60 | Translucent grey-brown. | Medium. |
| 2 | | 10 | 100 | | | | 10 | | 60 | Light grey brown. | Low. |
| 3 | | 200 | 100 | | | | 10 | | 60 | Deep grey brown. | High. |
| 4 | | 100 | 100 | 2.0 | 0.5 | | 5 | | 60 | " | " |
| 5 | 100 | 100 | 100 | | | | | 0.001 | 15 | Brown black | Opaque, high. |
| 6 | 100 | 10 | 100 | | | | | 0.003 | 25 | " | Medium. |
| 7 | 100 | 200 | 100 | | | | | 0.001 | 5 | " | Opaque, high. |
| 8 | 100 | 10 | 200 | | | | | 0.002 | 20 | " | High. |
| 9 | 100 | 200 | 200 | | | | | 0.001 | 5 | " | Opaque, high. |
| 10 | 20 | 100 | 100 | | | | | 0.001 | 15 | " | Medium. |
| 11 | 50 | 50 | 50 | 1.0 | 0.25 | | | 0.001 | 5 | " | Opaque, high. |
| 12 | 50 | 50 | 50 | 1.0 | 0.25 | 15.0 | | 0.001 | 5 | " | " |
| 13 | 50 | 50 | 50 | | | 15.0 | 5 | | | Green black | High. |

[1]Ultraviolet exposure at 10" G.E. sunlamp.
[2]Ultraviolet exposure xenon flash at 3 feet (85 watt/sec. at lamp).

EXAMPLE 14

| | Grams |
|---|---|
| 10% polyvinyl chloride solution | 100 |
| Diphenylamine | 5 |
| Hexachlorethane | 10 |
| N-vinylphenylnaphthylamine | 10 |
| 0.003 second ultraviolet exposure; color developed by heating: deep green black. | |

EXAMPLE 15

| | |
|---|---|
| 10% polystyrene solution | 100 |
| p-p'-Benzylidenebis(N-N'-dimethylaniline) | 2 |
| Carbon tetrabromide | 5 |
| N-vinylphthalimide | 10 |
| 0.001 second ultraviolet exposure; color developed by heating: deep green. | |

EXAMPLE 16

| | |
|---|---|
| 10% polyvinylacetate solution | 100 |
| Triphenylamine | 10 |
| N-vinylcarbazole | 10 |
| Carbon tetrabromide | 10 |
| 0.001 second ultraviolet exposure; color developed by heating: deep green brown. | |

EXAMPLE 17

| | |
|---|---|
| 10% polyvinylchloride solution | 100 |
| Diphenylamine | 5 |
| N-vinylindole | 10 |
| Carbon tetrabromide | 10 |
| 0.001 second ultraviolet exposure; color developed by heating: deep red brown. | |

EXAMPLE 18

| | |
|---|---|
| 10% polyvinylacetate | 100 |
| p-p'-p'-Methylidynetris(N-N'-dimethylaniline) | 1 |
| N-vinylphenylacetamide | 10 |
| Tetrachlorotetrahydronaphthalene | 10 |
| 0.003 second ultraviolet exposure; color developed by heating: deep blue. | |

EXAMPLE 19

| | |
|---|---|
| 10% polyvinylchloride solution | 200 |
| Tricresyl phosphate | 8 |
| Diphenylamine | 10 |
| N-vinylcarbazole | 10 |
| Carbon tetrabromide | 10 |
| N-N'-dimethylphenylazoaniline | 0.1 |
| Benzoin | 0.2 |
| Zinc sulfide | 8 |
| 0.001 second visible light exposure; color developed by heating: black. | |

EXAMPLE 20

To two hundred grams of a 10% solution of ethyl cellulose prepared as in Examples 1–13 there was added successively: 10 grams of diphenylamine, 10 grams of N-vinylcarbazole, 10 grams of carbon tetrabromide, 0.3 gram of benzoin, 5 grams of dioctylphthalate, and 3 grams of thioacetamide; the solution being mixed thoroughly to dissolve each addition. This was cast on a 0.5 mil thickness of cellophane maintained in a stretched condition and a plastic dope thickness used such that a dried film, after elimination of solvent, of 2 mils in thickness was obtained. All of these operations were carried out under a yellow safe light. The entire resulting film, ethyl cellulose surface facing up, was exposed to the 85 watt/second xenon capacitative discharge lamp for an exposure time of 0.001 second. A sheet of type written copy was then placed in contact with the previously exposed ethyl cellulose surface so that the lettering was placed against the ethyl cellulose surface. This was then wrapped tightly around an aluminum drum which was capable of being rotated at a rate of approximately one inch per second. The back of the typewritten copy was placed facing up. Positioned along the length of the drum and at a distance of roughly one inch is an inverted trough made of aluminum in whose apex is placed a coil of Nichrome wire along its entire length. This Nichrome wire coil was originally stabilized at a temperature of 650° C. The drum was then rotated containing the composite of typewritten paper and presensitized ethyl cellulose film at a speed of one inch per second under the aforesaid heat trough. After removal from the drum, a duplicate black image with sharp outlines had developed on the ethyl cellulose paper with substantially no fogging in the non-light exposed areas. The ethyl cellulose film was then allowed to stand in a dark box readily accessible to air for ten hours after which permanent fixing was achieved. This example defines one suitable photocopy procedure.

I claim:

1. A dry photographic film suitable for the production of visible images by exposure to a combination of light and heat, comprising (I) a film-forming plastic selected from the group consisting of cellulose derivatives and addition polymers; (II) an N-vinyl compound selected from the group consisting of N-vinylamines, N-vinylamides and N-vinylimides; and (III) a halogenated hydrocarbon compound selected from the group of compounds which produces free radicals upon exposure to light of a suitable wave length and in which there is present at least one active halogen selected from the group consisting of chlorine, bromine and iodine which is attached to a carbon atom having not more than one hydrogen atom attached thereto; there being between 0.1 and 2 parts by weight of N-vinyl compound and between 0.1 and 2 parts by weight of halogenated hydrocarbon per part of film-forming plastic, by weight.

2. The composition of claim 1 containing in addition up to 1 part by weight of an arylamine other than an N-vinylamine, per part of film forming plastic by weight.

3. The composition of claim 1 containing in addition up to 0.3 part by weight of a fixing agent selected from the group consisting of thioureas, thioamides, thiols, thioanilides, thiocarbazides and zinc sulfide, per part of film forming plastic.

4. The composition of claim 1 containing in addition between 0.005 and 0.01 part by weight of a sensitizer to visible light, per part of plastic.

5. The composition of claim 1 in which the halogenated hydrocarbon has an energy of formation of the free halogen radical of not less than forty kilogram calories per mol.

6. The composition of claim 1 in which the plastic is selected from the group consisting of ethyl cellulose, polyvinylchloride, polystrene, chlorinated rubber, polyvinylacetate, polymethylmethacrylate, cellulose acetate, copolymer of vinyl chloride and vinylidene chloride, and cellulose nitrate.

7. The composition of claim 1 wherein the halogenated hydrocarbon compound is selected from the group consisting of carbon tetrabromide, iodoform, hexachlorethane, hexachlorbenzene, tetrabrombutane and tetrachlortetrahydronaphthalene.

8. The composition of claim 1 containing in addition between 0.25 and 1.0 parts of a plasticizer per part by weight of plastic.

9. The composition of claim 2 wherein the aryl amine is selected from the group consisting of diphenylamine, dibenzylamine, triphenylamine, diphenyguanidine, triphenylguanidine, N-N′-dialkylanilines, and mixtures of aniline, paratoluidine and orthotoluidine.

10. The composition of claim 2 wherein the arylamine is diphenylamine, the N-vinyl compound is N-vinylcarbazole, the halogenated hydrocarbon compound is carbon tetrabromide, and the film-forming compound is ethyl cellulose.

11. A method of photographically producing a visible image which comprises preparing a film having the composition of claim 1 and exposing the film sequentially to a combination of light and thermal radiation, at least one of said exposures being an image-forming exposure and the other being a blanket exposure.

12. A method of developing visible images which comprises preparing the composition of claim 1 in a solvent for the film-forming plastic; depositing said composition on a support; evaporating said solvent, leaving a film consisting of a dispersion of the several ingredients in the film-forming plastic on said support; each of said processes prior to the formation of said film being conducted in the absence of radiation to which the composition exhibits a sensitivity, and exposing selected portions of the resulting article to light, whereby a reaction occurs to form a non-visible latent image in said film and thereafter producing a visible image by exposing said latent image to thermal radiation.

13. A method of developing visible photocopies which comprises preparing the composition of claim 1 in a solvent for the film-forming plastic; depositing said composition on a transparent support; evaporating said solvent, leaving a photosensitive film on said support; and exposing the entire surface of the resulting article to light, placing a sheet bearing an image to be copied adjacent to said sensitized exposed photosensitive film, and subjecting the presensitized film and image to be copied to heat to develop a duplicate of the desired image.

14. An article comprising the composition of claim 1 supported on a base.

15. The article of claim 14 wherein the base is transparent.

16. The article of claim 14 wherein the base is paper.

*17. Light-sensitive material comprising a suitable support and a light-sensitive coating thereon, said coating comprising the dried residue of a homogeneous solution in a suitable solvent, said residue comprising:*

*a. a leuco triaryl methane dye, selected from the group consisting of leuco crystal violet, leuco malachite green, fuchsine base, leuco pararosaniline;*

*b. an N-vinyl carbazole, selected from the group consisting of N-vinyl carbazole and its alkyl derivatives; and*

*c. a halogen hydrocarbon which splits off halogen when exposed to light, said halogen hydrocarbon having the general formula:*

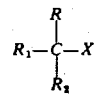

*wherein X represents chlorine, bromine or iodine, and R, $R_1$ and $R_2$ are the same or are different and represent chlorine, bromine, iodine, hydrogen, alkyl, aryl, aralkyl, alkenyl or a heterocyclic group.*

*18. Light-sensitive material according to claim 17, wherein said composition includes a binder material selected from the group consisting of natural and synthetic resins.*

*19. Light-sensitive material according to claim 17, wherein said composition includes a binder material selected from the group consisting of natural and synthetic resins having substantial solubility in both an organic and an aqueous alkaline solution.*

*20. Light-sensitive material according to claim 17, wherein said halogen hydrocarbon is selected from the group consisting of: tetrabromomethane.*

*21. Light-sensitive material according to claim 17, wherein said composition comprises:*

*a. leuco crystal violet,*

*b. N-vinyl carbazole, and*

*c. tetrabromomethane.*

* * * * *